United States Patent [19]
Blacker

[11] 3,837,045
[45] Sept. 24, 1974

[54] PROCESS AND APPARATUS FOR EVISCERATING POULTRY

[75] Inventor: Harold F. Blacker, Fremont

[73] Assignee: Campbell Soup Company, Camden, N.J.

[22] Filed: Jan. 17, 1973

[21] Appl. No.: 324,330

[52] U.S. Cl. .................................................. 17/11
[51] Int. Cl............................................ A22b 3/08
[58] Field of Search ........................ 17/1, 11, 23, 43

[56] References Cited
UNITED STATES PATENTS
| | | | |
|---|---|---|---|
| 3,662,430 | 5/1972 | Lloyd | 17/11 |
| 3,750,231 | 8/1973 | Schreuder | 17/11 |

Primary Examiner—Robert Peshock
Attorney, Agent, or Firm—John W. Logan, Jr.

[57] ABSTRACT

Evisceration of poultry is accomplished by making two closely spaced parallel cuts through the back of the poultry carcass extending from the vent opening at the tail end of the carcass to a point adjacent the neck. The cuts are made at opposite sides of the backbone completely through the ribs and the viscera is grasped at the vent opening and pulled through the back cut toward the neck. The apparatus for accomplishing this includes a toothed conveyor which engages the carcass along its backbone and draws the carcass in a lengthwise direction across a pair of closely spaced continuously rotating cutters. A hold down bar is provided to force the carcass against the toothed conveyor and guide movement of the carcass during the cutting operation.

7 Claims, 3 Drawing Figures

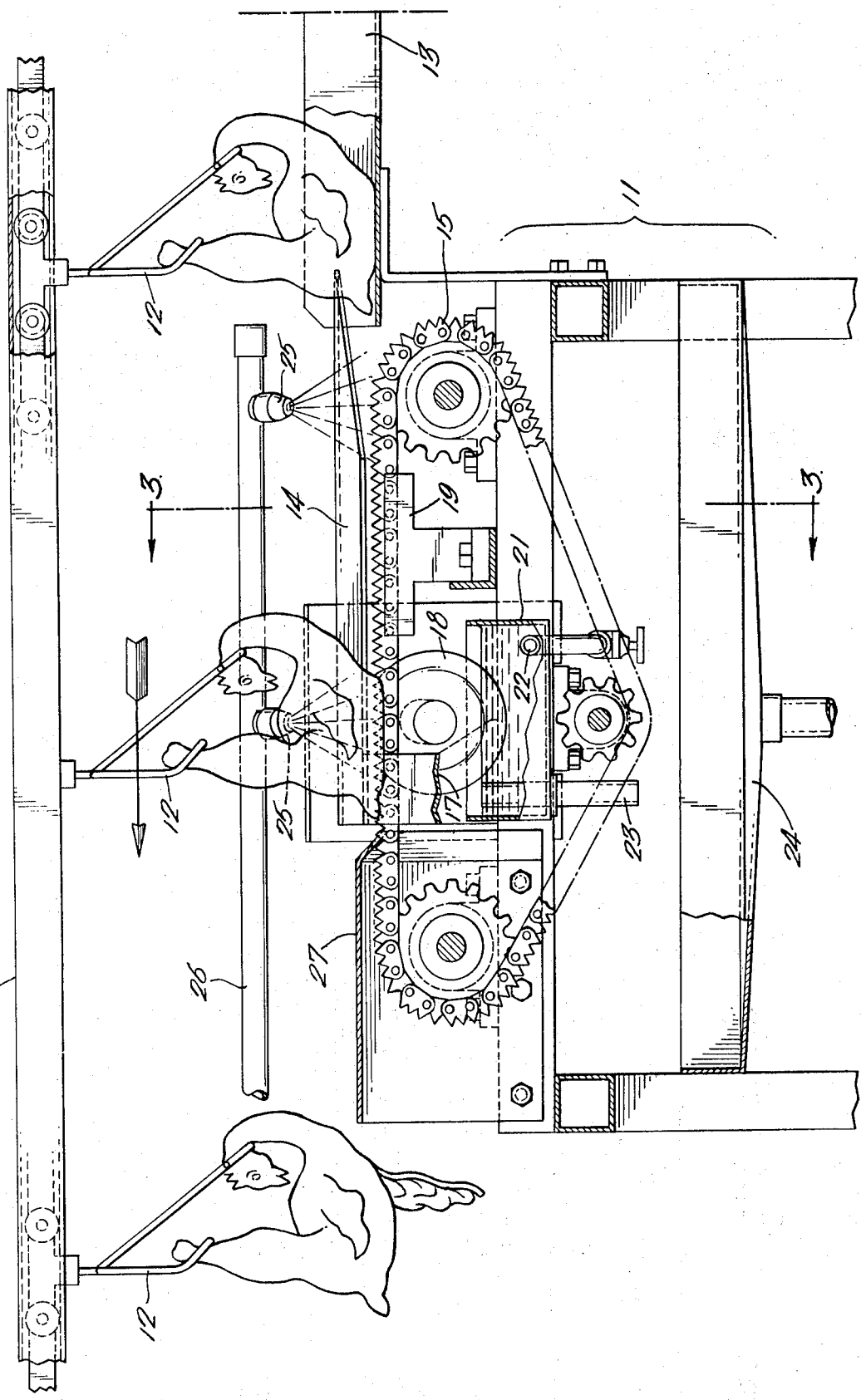

PROCESS AND APPARATUS FOR EVISCERATING POULTRY

The present invention relates to new and useful improvements in a process for eviscerating poultry and to apparatus for carrying out this process.

Prior to the present invention, poultry was eviscerated by cutting the usual vent opening at the tail of the poultry and manually reaching in through the vent opening to remove the viscera. In a commercial operation this is an expensive, time-consuming operation and does not leave the carcass in position for the required rapid and thorough inspection of the eviscerating operation. Also, this prior eviscerating process required considerable manual handling and positioning of the poultry and did not contribute to a mechanized operation for treatment of poultry carcasses.

With the foregoing in mind, a primary object of the present invention is to provide a novel process for eviscerating poultry by cutting the carcass lengthwise of the back from the vent opening toward the neck and removing the viscera through this cut.

Another object of the present invention is to provide a novel process for eviscerating poultry through a back opening which can be accomplished with a substantial amount of automation at a rapid rate of speed with less handling of the bird and less time expended for manual labor, leaving the carcass in condition for a rapid and thorough inspection.

A further object of the present invention is to provide novel apparatus to prepare the carcass of a bird for evisceration through a back opening in a safe and efficient manner.

These and other objects of the present invention and the various features and details of the operation and construction thereof are hereinafter more fully set forth and described with reference to the accompanying drawings, in which:

FIG. 1 is a side elevational view partially in section of apparatus for accomplishing the evisceration process of the present invention;

Figure 3:
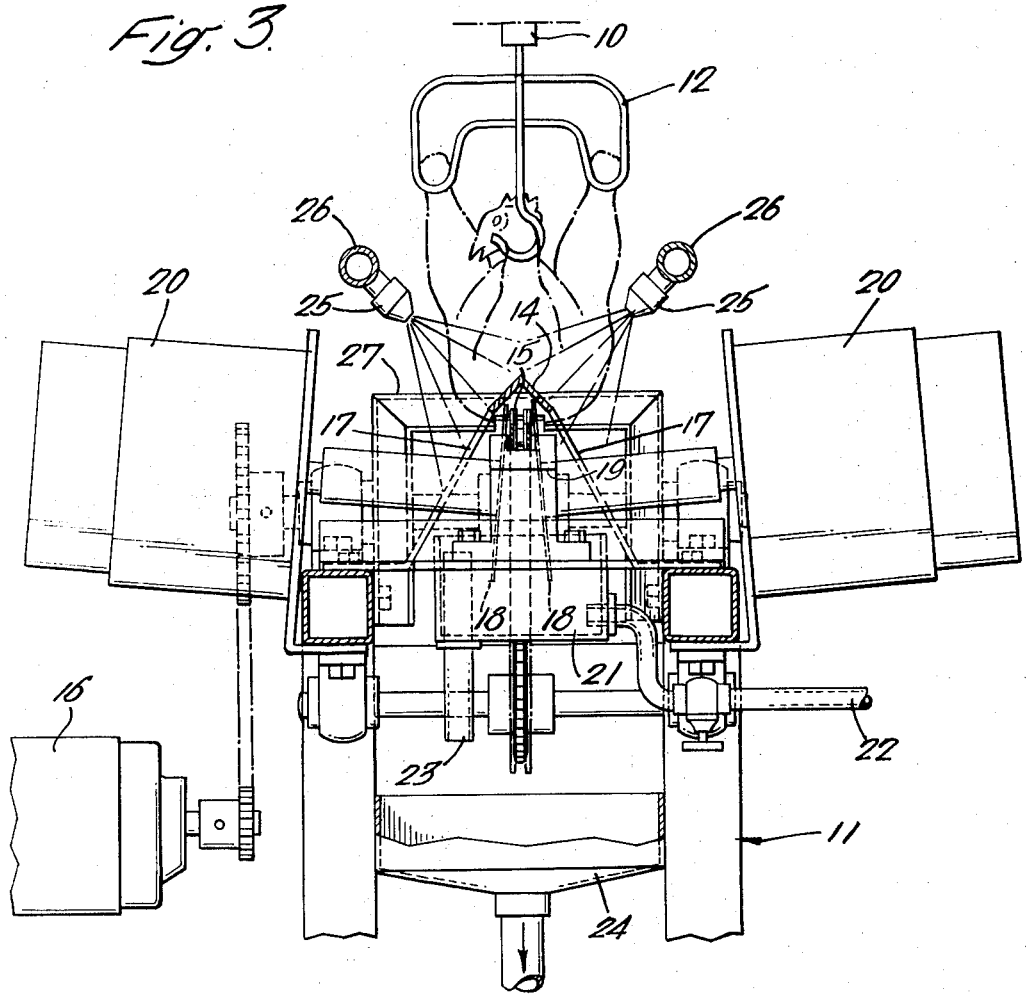
FIG. 3 is a transverse sectional view taken on line 3—3, FIG. 1.
Figure 2:
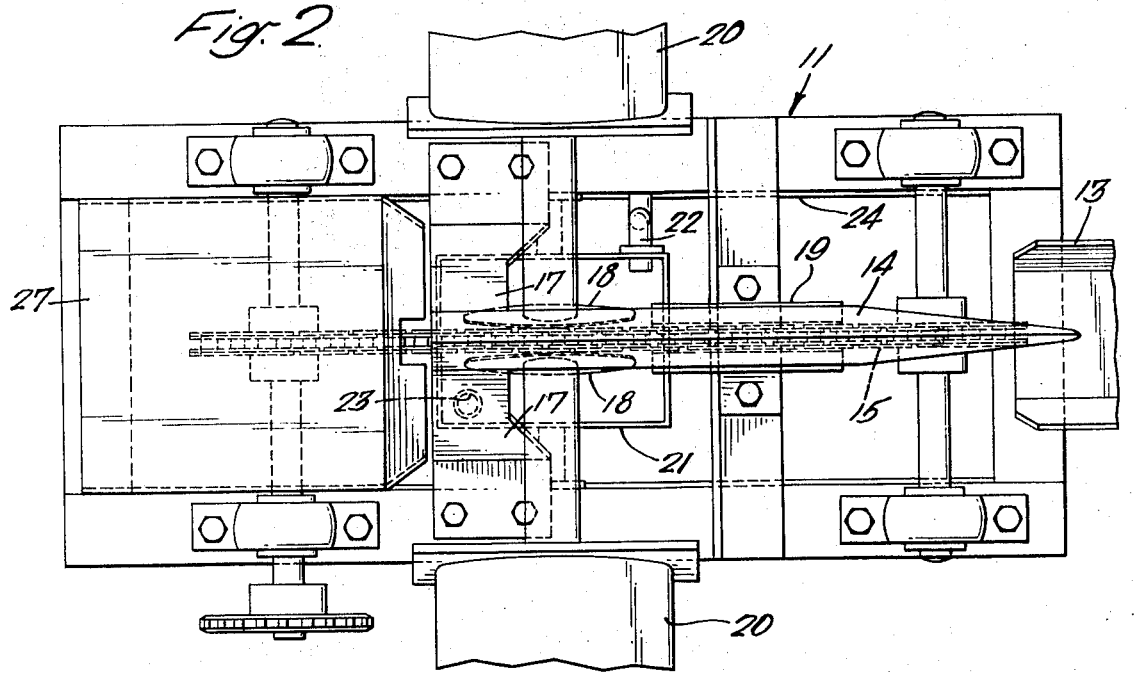
FIG. 2 is a plan view of the apparatus.

According to the present invention, the process for eviscerating poultry starts with first taking slaughtered and plucked poultry and forming the usual vent opening adjacent the tail end of poultry carcass. Thereafter, the carcass is cut along the backbone from the vent opening to a point near the neck.

This cut is made completely through the skin and backbone or ribs adjacent the backbone into the internal cavity of the carcass. Preferably the cut at the back of the carcass is formed by suspending the carcass with its back facing downward and its tail facing forward and conveying the suspended carcass lengthwise past a pair of closely spaced cutting blades. These blades cut completely through the back of the carcass along closely spaced lines at opposite sides of the backbone of the carcass from the vent opening to a point adjacent the neck. The viscera is then grasped through the vent opening and pulled out of the carcass cavity through the cut back. It is desirable in carrying out the process of the present invention to permit the viscera to remain attached to a flap of skin adjacent the neck of the carcass after the viscera is pulled outwardly through the back opening to permit inspection of the eviscerated carcass while it is still in a suspended position. Thereafter, the viscera is detached from the carcass and the carcass is transferred to a further processing operation. The cutting blades used to form the back opening may be conventional rotary meat cutting knives partially immersed in a bath of hot water. If desired, the carcass may be washed with a dilute chlorine water spray while it is being cut.

Referring more specifically to the drawings, poultry to be processed according to the present invention is fed by a continuously operating conveyor 10 to a cutting machine 11 which prepares the poultry for evisceration. The conveyor 10 may be a monorail type conveyor having conventional poultry supporting shackles 12 depending therefrom at spaced intervals. The shackles 12 are designed to engage the legs and neck of the dressed poultry carcass as shown in FIG. 1, and convey the same in a back down, tail end forward position toward the cutting machine. The poultry to be eviscerated is prepared for this operation by being killed and plucked, and the usual vent opening is cut at the tail of the carcass.

A guide chute 13 is positioned adjacent the forward end of the cutting machine to engage and guide the carcass toward the forward free end of a guide bar 14 which serves to engage the carcass and hold the same against the upper run of a toothed conveyor 15 driven, for example, by means of an electric motor 16 in the same direction and the same speed as the conveyor 10. The guide bar 14 forces the carcass into positive engagement with the sharpened teeth of the conveyor 15 to insure a positive movement of the carcass in a fixed position through the cutting machine.

The guide bar 14 is mounted in cantilever fashion at its rear end, for example, by braces 17, 17 which extend diagonally downward and outward from the guide bar to the frame of the cutting machine as shown in FIGS. 1 and 3. Preferably the guide bar 14 is of inverted V-shape in cross-section with the opposite legs of the V extending down to or slightly below the upper end of the teeth of the conveyor 15 to insure positive engagement of the carcass by the conveyor teeth. As the carcass enters the cutting machine, this guide bar 14 enters the vent opening formed adjacent the tail end of the carcass to force the backbone of the carcass against the teeth of the conveyor 15. Continued forward movement of the carcass causes the forward end of the guide bar to pierce through the skin of the carcass adjacent the neck.

Movement of the conveyor 15 draws the carcass longitudinally across a pair of spaced apart, continuously rotating cutting blades 18, 18 which provide a pair of cuts in the carcass extending completely through the skin and ribs of the carcass into the internal cavity of the carcass, with the cuts starting at the vent opening and extending longitudinally of the carcass to a point adjacent the neck. A conveyor guide and support member 19 may be provided immediately in advance of the cutting blades 18, 18 to prevent lateral and vertical movement of the conveyor immediately prior to the carcass being engaged by the cutting blades. The cutting blades are continuously driven at a high rate of speed by motors 20, 20 and are angled inwardly and upwardly toward one another and terminate above the teeth of the conveyor 15. The cuts provided in the carcass should be at opposite sides of the backbone of the carcass and spaced apart approximately three-eighths to three-fourths of an inch depending on the size of the carcass. Adjusting means, not shown, may be provided to permit adjustment of the position of the cutting blades to obtain the desired cuts.

In order to keep the cutting blades clean during the cutting operation they may be immersed in a bath of hot water provided in pan 21 positioned beneath the cutting blades. Hot water is admitted to the pan from an inlet pipe 22 and is discharged through an overflow pipe 23 into a collection trough 24 which discharges the water to a drain. If desired, the carcass can be continuously sprayed with a dilute chlorine water spray during the cutting operation by a series of nozzles 25 extending from supply pipes 26, 26 at opposite sides of the carcass and directed toward the carcass. The spray from these nozzles is also collected in the trough 24.

Further continued movement of the carcass after it is cut by the blades causes the carcass to be pulled off of the end of the guide bar over a guard plate 27 at the discharge end of the machine. As the carcass leaves the cutting machine, the eviscerating process is completed by grasping the viscera through the vent opening in the carcass and pulling the viscera out of the carcass through the back opening formed by the cutting blades. The viscera may be permitted to remain in this position partially attached to the flap of skin adjacent the neck formed by the cutting operation to permit inspection of the eviscerated carcass while the carcass is still suspended from the conveyor shackles 12. Thereafter, the viscera is cut away from the carcass and the carcass is transported to a further processing operation.

From the foregoing, it will be observed that the present invention provides a novel process and apparatus for eviscerating poultry through a back opening formed in the poultry carcass with a minimum of manual labor and leaving the carcass in a position for rapid, thorough inspection before the carcass is transported to a further processing operation.

While a particular embodiment of the present invention is illustrated and described herein, it should be understood that changes and modifications may be incorporated and embodied therein within the scope of the following claims.

I claim:

1. A process for eviscerating slaughtered and plucked poultry including the steps of: forming a vent opening adjacent the tail end of the poultry carcass, cutting completely through the back of the carcass along the backbone from the vent opening to a point near the neck along a pair of spaced parallel cuts which extend through the skin and ribs of the carcass at opposite sides of the backbone of the carcass, and grasping the viscera of the carcass through the vent opening and removing the same from the interior of the carcass through the opening in the back of the carcass formed by the spaced parallel cuts.

2. A process for eviscerating slaughtered and plucked poultry including the steps of: forming a vent opening adjacent the tail end of the carcass, suspending the carcass in a back down tail end forward position, conveying the suspended carcass across a cuttng blade, cutting the conveyed suspended carcass completely through the back of the carcass along the backbone from the vent opening to a point near the neck, and grasping the viscera of the carcass through the vent opening and removing the same from the interior of the carcass through the cut in the back of the carcass.

3. A process according to claim 2 in which the viscera is grasped while the carcass is still suspended in the back down, tail forward position and removed from the internal cavity of the carcass through the cut in the back of the carcass.

4. A process according to claim 3 in which the cutting step includes providing a pair of spaced parallel cuts through the skin and ribs of the carcass at opposite sides of the backbone extending from the vent opening to a point near the neck.

5. A process according to claim 4 including the step of leaving the viscera attached to the skin of the carcass after removal to the internal cavity of the carcass, and inspecting the eviscerated carcass while suspended and prior to the removal of the viscera from the attachment to the skin of the carcass.

6. Apparatus for preparing for eviscerating the carcass of slaughtered and plucked poultry in which a vent opening into the internal cavity of the carcass has been provided at the tail end of the carcass comprising: first conveyor means for suspending the carcass by the legs and neck in a back down, tail end forward position and conveying the same longitudinally at a uniform rate of speed, a toothed conveyor positioned beneath said first conveyor means, said toothed conveyor having sharpened teeth thereon projecting upwardly toward said first conveyor means, means to drive said toothed conveyor in the same direction at the same rate of speed as said first conveyor means, a pair of continuously rotating cutting blades positioned closely adjacent opposite sides of said toothed conveyor and extending upwardly adjacent the sides of the teeth of said conveyor, a guide bar positioned above said toothed conveyor adapted to engage in the internal cavity of the carcass and force the carcass downwardly onto said toothed conveyor to cause the carcass to be drawn by said toothed conveyor across said cutting blades, and guide means to direct said carcass onto said guide bar in a back down, tail end forward position.

7. Apparatus according to claim 6 in which said guide bar is mounted adjacent said cutting blades and projects toward said guide means, said guide bar having an inverted V-shaped cross-sectional shape with the opposite legs of the inverted V projecting downwardly adjacent opposite sides of the teeth of said toothed conveyor.

* * * * *